United States Patent
Xu et al.

(10) Patent No.: US 11,017,168 B2
(45) Date of Patent: May 25, 2021

(54) LEXICAL ANALYZER FOR A NEURO-LINGUISTIC BEHAVIOR RECOGNITION SYSTEM

(71) Applicant: Intellective Ai, Inc., Dallas, TX (US)

(72) Inventors: Gang Xu, Houston, TX (US); Ming-Jung Seow, Richmond, TX (US); Tao Yang, Katy, TX (US); Wesley Kenneth Cobb, The Woodlands, TX (US)

(73) Assignee: Intellective Ai, Inc., Houston, TX (US)

( * ) Notice: Subject to any disclaimer, the term of this patent is extended or adjusted under 35 U.S.C. 154(b) by 0 days.

(21) Appl. No.: 16/523,500

(22) Filed: Jul. 26, 2019

(65) Prior Publication Data
US 2020/0193091 A1 Jun. 18, 2020

Related U.S. Application Data

(63) Continuation of application No. 14/569,104, filed on Dec. 12, 2014, now Pat. No. 10,409,909.

(51) Int. Cl.
*G06F 40/30* (2020.01)
*G06N 20/00* (2019.01)
(Continued)

(52) U.S. Cl.
CPC .......... *G06F 40/242* (2020.01); *G06F 40/289* (2020.01); *G06N 5/045* (2013.01); *G06N 20/00* (2019.01)

(58) Field of Classification Search
CPC ...... G06F 40/284; G06F 40/289; G06F 40/30; G06F 21/554; G06F 11/327; G06F 17/18; G06F 40/216
See application file for complete search history.

(56) References Cited

U.S. PATENT DOCUMENTS 4,679,077 A 7/1987 Yuasa et al.
5,113,507 A 5/1992 Jaeckel
(Continued)

FOREIGN PATENT DOCUMENTS

WO WO 2009/049314 4/2009

OTHER PUBLICATIONS

International Search Report and Written Opinion for International Application No. PCT/US2015/064954, dated Feb. 26, 2016, 6 pages.
(Continued)

*Primary Examiner* — Olujimi A Adesanya

(57) ABSTRACT

Techniques are disclosed for building a dictionary of words from combinations of symbols generated based on input data. A neuro-linguistic behavior recognition system includes a neuro-linguistic module that generates a linguistic model that describes data input from a source (e.g., video data, SCADA data, etc.). To generate words for the linguistic model, a lexical analyzer component in the neuro-linguistic module receives a stream of symbols, each symbol generated based on an ordered stream of normalized vectors generated from input data. The lexical analyzer component determines words from combinations of the symbols based on a hierarchical learning model having one or more levels. Each level indicates a length of the words to be identified at that level. Statistics are evaluated for the words identified at each level. The lexical analyzer component identifies one or more of the words having statistical significance.

20 Claims, 10 Drawing Sheets

(51) Int. Cl.
   *G06F 40/242* (2020.01)
   *G06N 5/04* (2006.01)
   *G06F 40/289* (2020.01)

(56) References Cited

U.S. PATENT DOCUMENTS

| | | | |
|---|---|---|---|
| 5,317,507 A | 5/1994 | Gallant | |
| 5,748,775 A | 5/1998 | Tsuchikawa et al. | |
| 5,751,378 A | 5/1998 | Chen et al. | |
| 5,969,755 A | 10/1999 | Courtney | |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |
| 6,940,998 B2 | 9/2005 | Garoutte | |
| 7,076,102 B2 | 7/2006 | Lin et al. | |
| 7,136,525 B1 | 11/2006 | Toyama et al. | |
| 7,158,680 B2 | 1/2007 | Pace | |
| 7,171,358 B2 | 1/2007 | Whittaker et al. | |
| 7,200,266 B2 | 4/2007 | Ozer et al. | |
| 7,227,893 B1 | 6/2007 | Srinivasa et al. | |
| 7,391,907 B1 | 6/2008 | Venetianer et al. | |
| 7,436,887 B2 | 10/2008 | Yeredor et al. | |
| 7,519,589 B2 | 4/2009 | Charnock et al. | |
| 7,825,954 B2 | 11/2010 | Zhang et al. | |
| 7,868,912 B2 | 1/2011 | Venetianer et al. | |
| 8,316,030 B2 | 11/2012 | Koperda et al. | |
| 9,507,768 B2 | 11/2016 | Cobb et al. | |
| 9,639,521 B2 | 5/2017 | Seow et al. | |
| 9,973,523 B2 | 5/2018 | Cobb et al. | |
| 10,187,415 B2 | 1/2019 | Seow et al. | |
| 10,409,909 B2 | 9/2019 | Xu et al. | |
| 2003/0107650 A1 | 6/2003 | Colmenarez et al. | |
| 2003/0130976 A1 | 7/2003 | Au | |
| 2003/0228058 A1 | 12/2003 | Xie et al. | |
| 2004/0151342 A1 | 8/2004 | Venetianer et al. | |
| 2005/0001759 A1 | 1/2005 | Khosla | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0095521 A1 | 5/2006 | Patinkin | |
| 2006/0138338 A1 | 6/2006 | Tezuka et al. | |
| 2006/0165386 A1 | 7/2006 | Garoutte | |
| 2006/0190419 A1 | 8/2006 | Bunn et al. | |
| 2006/0193516 A1 | 8/2006 | Toyama et al. | |
| 2006/0222206 A1 | 10/2006 | Garoutte | |
| 2007/0094066 A1 | 4/2007 | Kumar et al. | |
| 2007/0250898 A1 | 10/2007 | Scanlon et al. | |
| 2008/0002856 A1 | 1/2008 | Ma et al. | |
| 2008/0059187 A1 | 3/2008 | Roitblat et al. | |
| 2008/0109454 A1 | 5/2008 | Willse et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0247599 A1 | 10/2008 | Porikli et al. | |
| 2008/0252723 A1 | 10/2008 | Park | |
| 2009/0016599 A1 | 1/2009 | Eaton et al. | |
| 2009/0022364 A1 | 1/2009 | Swaminathan et al. | |
| 2009/0067716 A1 | 3/2009 | Brown et al. | |
| 2009/0094064 A1 | 4/2009 | Tyler et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0057509 A1 | 3/2010 | Kumar et al. | |
| 2010/0063949 A1 | 3/2010 | Eaton et al. | |
| 2010/0150471 A1 | 6/2010 | Cobb et al. | |
| 2010/0179838 A1 | 7/2010 | Basant et al. | |
| 2010/0198592 A1 | 8/2010 | Potter | |
| 2010/0293048 A1 | 11/2010 | Singolda et al. | |
| 2010/0312769 A1* | 12/2010 | Bailey | G06F 16/285 707/740 |
| 2010/0322516 A1 | 12/2010 | Xu et al. | |
| 2011/0064267 A1 | 3/2011 | Cobb et al. | |
| 2011/0064268 A1 | 3/2011 | Cobb et al. | |
| 2012/0102033 A1 | 4/2012 | Sarshar et al. | |
| 2012/0137367 A1 | 5/2012 | Dupont et al. | |
| 2013/0031061 A1 | 1/2013 | Jagota | |
| 2013/0124435 A1 | 5/2013 | Estes | |
| 2013/0132311 A1 | 5/2013 | Liu et al. | |
| 2013/0135123 A1 | 5/2013 | Golander et al. | |
| 2013/0246322 A1 | 9/2013 | De Sousa Webber | |
| 2014/0067377 A1 | 3/2014 | Reiter | |
| 2014/0163968 A1 | 6/2014 | Ehsani et al. | |
| 2014/0201126 A1 | 7/2014 | Zadeh et al. | |
| 2014/0351267 A1 | 11/2014 | Kumar | |
| 2015/0046155 A1 | 2/2015 | Seow et al. | |
| 2015/0082437 A1* | 3/2015 | Dodson | G06F 21/552 726/23 |
| 2016/0170961 A1 | 6/2016 | Seow et al. | |
| 2016/0170964 A1 | 6/2016 | Xu et al. | |
| 2016/0217133 A1* | 7/2016 | Reiter | G08B 5/22 |

OTHER PUBLICATIONS

International Search Report and Written Opinion for International Application No. PCT/US2015/064931, dated Feb. 12, 2016, 9 pages.

Apewokin et al. "Multimodal Mean Adaptive Backgrounding for Embedded Real-Time Video Surveillance," Jun. 2007, IEEE 6 pages, Minneapolis, MN.

Connell, J. et al., "Detection and Tracking in the IBM PeopleVision System," IEEE ICME, Jun. 2004, pp. 1-4.

Elgammal et al. "Non-parametric Model for Background Subtraction," Computer Vision Laboratory, University of Maryland; Jun. 2000; 17 pages, College Park, MD.

Grabner, H. et al., "On-line Boosting and Vision," IEEE Conference on Computer Vision and Pattern Recognition (CVPR), 2006, vol. 1, pp. 260-267.

Haritaoglu, I. et al., "Ghost: A Human Body Part Labeling System Using Silhouettes," 14th Annual International Conference on Pattern Recognition, Aug. 16-20, 1998, Brisbane, Australia, 6 pages.

Haritaoglu, I. et al., "W4: Real-time surveillance of people and their activities," IEEE Transactions on Pattern Analysis and Machine Intelligence, 22(8):809-830 (Aug. 2000).

Ivanov et al. "Video Surveillance of Interactions," MIT Media Laboratory, Cambridge, MA, Jul. 1999, 8 pages, Fort Collins, CO.

Kanerva, P., "Sparse Distributed memory and Related Models," M.H. Hassoun, ed., Associative Neural Memories: Theory and Implementation, 1993, pp. 50-76, New York: Oxford University Press.

Nock, R. et al., "Statistical Region Merging," IEEE Transactions on Pattern Analysis and Machine Intelligence, Nov. 2004, 26(11):1452-1458.

Senior et al. "Appearance Models for Occlusion Handling," IBM T.J. Watson Research Center, 2001, 8 pages, Yorktown Heights, NY.

Stauffer, C. et al., "Adaptive background mixture models for real-time tracking," Proceedings IEEE Conference on Computer Vision and Pattern Recognition, 1999: pp. 246-252.

Stauffer, C. et al., "Learning Patterns of Activity Using Real-Time Tracking," IEEE Transactions on Pattern Analysis and Machine Intelligence (TPAMI), Aug. 2000, 22(8): 747-757.

* cited by examiner

LEXICAL ANALYZER FOR A NEURO-LINGUISTIC BEHAVIOR RECOGNITION SYSTEM

CROSS-REFERENCE TO RELATED APPLICATIONS

This application is a continuation of U.S. patent application Ser. No. 14/569,104, filed Dec. 12, 2014, which is hereby incorporated by reference in its entirety.

BACKGROUND

Field

Embodiments described herein generally relate to data analysis systems, and more particularly, to building dictionaries of words based on input data to be used in a neuro-linguistic behavior recognition system.

Description of the Related Art

Many currently available surveillance and monitoring systems (e.g., video surveillance systems, SCADA systems, and the like) are trained to observe specific activities and alert an administrator after detecting those activities. However, such rules-based systems require advance knowledge of what actions and/or objects to observe. The activities may be hard-coded into underlying applications or the system may train itself based on any provided definitions or rules. In other words, unless the underlying code includes descriptions of certain behaviors or rules for generating an alert for a given observation, the system is incapable of recognizing such behaviors. However, such a rules-based approach is rigid. That is, unless a given behavior conforms to a pre-defined rule, an occurrence of the behavior can go undetected by the monitoring system. Even if the system trains itself to identify the behavior, the system requires rules to be defined in advance for what to identify.

In addition, many surveillance systems, e.g., video surveillance systems, require a significant amount of computing resources, including processor power, storage, and bandwidth. For example, typical video surveillance systems require a large amount of computing resources per camera feed because of the typical size of video data. Given the cost of the resources, such systems are difficult to scale.

SUMMARY

One embodiment presented herein includes a method for building a dictionary of words from combinations of symbols based on input data. The method generally includes receiving a stream of symbols. Each symbol is associated with a cluster of vectors generated from input data. The method also includes determining words from combinations of the symbols in the stream based on a hierarchical learning model having one or more levels. Each level indicates a length of the words to be identified at that level. Statistics are evaluated for the words identified at each level. The method also includes identifying one or more of the words having statistical significance based on the evaluated statistics.

Another embodiment presented herein includes a computer-readable storage medium storing instructions, which, when executed on a processor, performs an operation for building a dictionary of words from combinations of symbols generated based on input data. The operation itself generally includes receiving a stream of symbols. Each symbol is associated with a cluster of vectors generated from input data. The operation also includes determining words from combinations of the symbols in the stream based on a hierarchical learning model having one or more levels. Each level indicates a length of the words to be identified at that level. Statistics are evaluated for the words identified at each level. The operation also includes identifying one or more of the words having statistical significance based on the evaluated statistics.

Yet another embodiment presented herein includes a system having a processor and a memory storing one or more application programs configured to perform an operation for building a dictionary of words from combinations of symbols generated based on input data. The operation itself generally includes receiving a stream of symbols. Each symbol is associated with a cluster of vectors generated from input data. The operation also includes determining words from combinations of the symbols in the stream based on a hierarchical learning model having one or more levels. Each level indicates a length of the words to be identified at that level. Statistics are evaluated for the words identified at each level. The operation also includes identifying one or more of the words having statistical significance based on the evaluated statistics.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
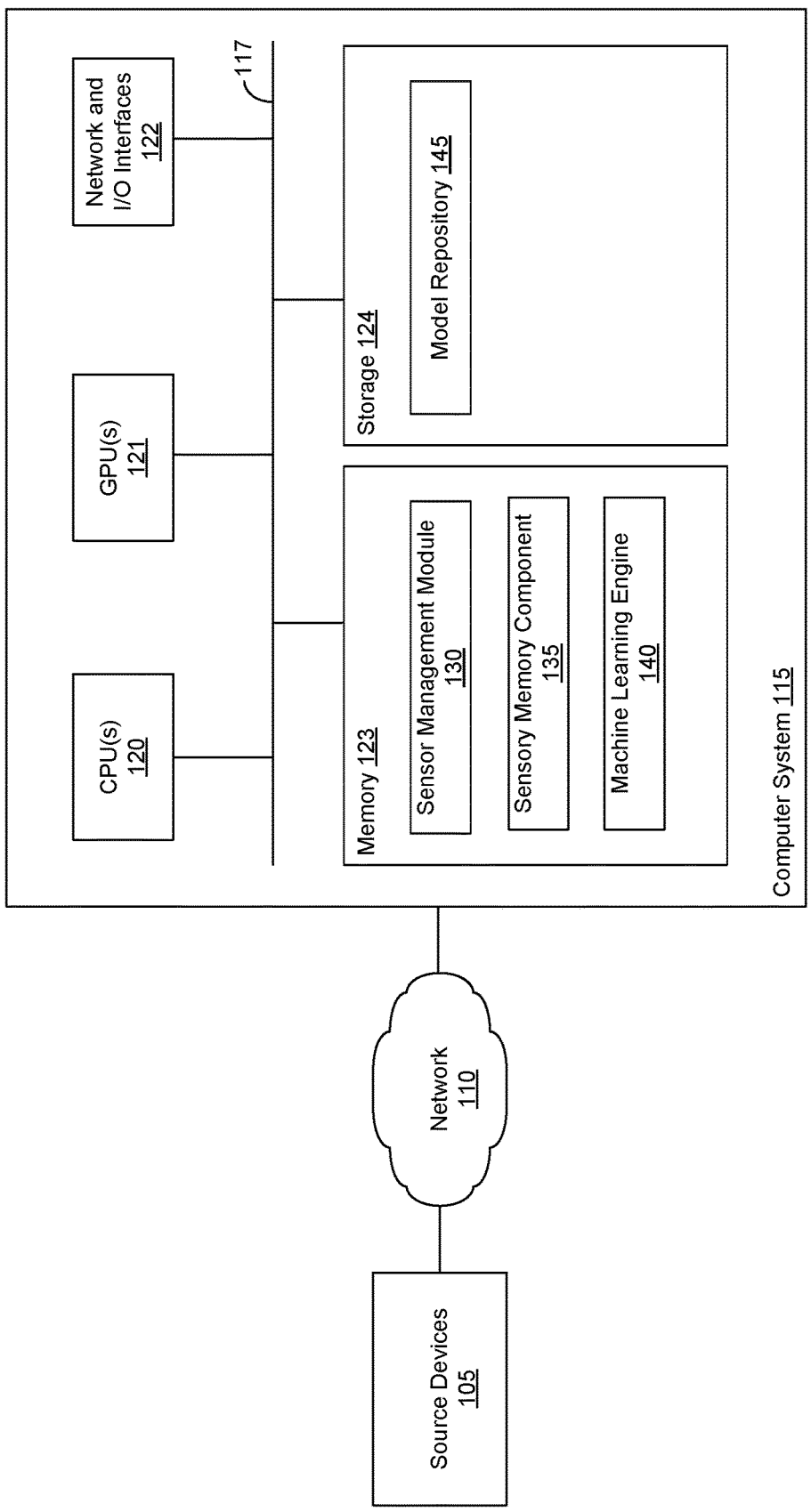
FIG. 1 illustrates an example computing environment for a neuro-linguistic behavior recognition system, according to one embodiment.

Embodiments presented herein describe a behavior recognition system. The behavior recognition system may be configured with one or more data collector components that collect raw data values from different data sources (e.g., video data, building management data, SCADA data). For example, a behavior recognition system may be configured for video surveillance. The behavior recognition system may include a data collector component that retrieves video frames in real-time, separates foreground objects from background objects, and tracks foreground objects from frame-to-frame. The data collector component may normalize the video frame data into numerical values (e.g., falling within a range from 0 to 1 with respect to a given data type).

In one embodiment, the behavior recognition system includes a neuro-linguistic module that performs neural network-based linguistic analysis on the collected data. Specifically, for each type of data monitored by a sensor, the neuro-linguistic module creates and refines a linguistic model of the normalized data. That is, the neuro-linguistic module builds a grammar used to describe the normalized data. The linguistic model includes symbols that serve as building blocks for the grammar. The neuro-linguistic module identifies combinations of symbols to build a dictionary of words. Once the dictionary is built, the neuro-linguistic module identifies phrases that include various combinations of words in the dictionary. The behavior recognition system uses such a linguistic model to describe what is being observed. The linguistic model allows the behavior recognition system to distinguish between normal and abnormal activity observed in the input data. As a result, the behavior recognition system can issue alerts whenever abnormal activity occurs.

To generate the linguistic model, the neuro-linguistic module receives normalized data values and organizes the data into clusters. The neuro-linguistic module evaluates statistics of each cluster and identifies statistically relevant clusters. Further, the neuro-linguistic module generates symbols, e.g., letters, corresponding to each statistically relevant cluster. Thus, input values mapping to a given cluster may correspond to a symbol.

The neuro-linguistic module generates a lexicon, i.e., builds a dictionary, of observed combinations of symbols, i.e., words, based on a statistical distribution of symbols identified in the input data. Specifically, the neuro-linguistic module may identify patterns of symbols in the input data at different frequencies of occurrence. Further, the neuro-linguistic module can identify statistically relevant combinations of symbols at different lengths (e.g., from one-symbol to a maximum-symbol word length). The neuro-linguistic module may include such statistically relevant combinations of symbols in a dictionary used to identify phrases for the linguistic model.

Using words from the dictionary, the neuro-linguistic module generates phrases based on probabilistic relationships of each word occurring in sequence relative to other words as additional data is observed. For example, the neuro-linguistic module may identify a relationship between a given three-letter word that frequently appears in sequence with a given four-letter word, and so on. The neuro-linguistic module determines a syntax based on the identified phrases.

The syntax allows the behavior recognition system to learn, identify, and recognize patterns of behavior without the aid or guidance of predefined activities. Unlike a rules-based surveillance system, which contains predefined patterns of what to identify or observe, the behavior recognition system learns patterns by generalizing input and building behavior memories of what is observed. Over time, the behavior recognition system uses these memories to distinguish between normal and anomalous behavior reflected in observed data.

For instance, the neuro-linguistic module builds letters, words (nouns, adjectives, verbs, etc.), phrases, and estimates an "unusualness score" for each identified letter, word, or phrase. The unusualness score (for a letter, word, or phrase observed in input data) indicates how infrequently the letter, word, or phrase has occurred relative to past observations. Thus, the behavior recognition system may use the unusualness scores to both identify and measure how unusual a current syntax is relative to a stable model of symbols (i.e., letters), a stable model of words built from the symbols (i.e., a dictionary) and a stable model of phrase built from the words (i.e., a syntax)—collectively the neuro-linguistic model.

As the neuro-linguistic module continues to receive input data, the neuro-linguistic module may decay, reinforce, and generate the letters, words, and syntax models. In parlance with the machine learning field, the neuro-linguistic module "learns on-line" as new data is received and occurrences a given type of input data either increases, decreases, appears, or disappears.

FIG. 1 illustrates components of a behavioral recognition system 100, according to one embodiment. As shown, the behavioral recognition system 100 includes one or more input source devices 105, a network 110, and one or more computer systems 115. The network 110 may transmit data input by the source devices 105 to the computer system 115. Generally, the computing environment 100 may include one or more physical computer systems 115 connected via a network (e.g., the Internet). Alternatively, the computer systems 115 may be cloud computing resources connected by the network. Illustratively, the computer system 115 includes one or more central processing units (CPU) 120, one or more graphics processing units (GPU) 121, network and I/O interfaces 122, a storage 124 (e.g., a disk drive, optical disk drive, and the like), and a memory 123 that includes a sensor management module 130, a sensory memory component 135, and a machine learning engine 140. The storage 124 includes a model repository 145.

The CPU 120 retrieves and executes programming instructions stored in the memory 123 as well as stores and retrieves application data residing in the storage 124. In one embodiment, the GPU 121 implements a Compute Unified Device Architecture (CUDA). Further, the GPU 121 is configured to provide general purpose processing using the parallel throughput architecture of the GPU 121 to more efficiently retrieve and execute programming instructions stored in the memory 123 and also to store and retrieve application data residing in the storage 124. The parallel throughput architecture provides thousands of cores for processing the application and input data. As a result, the GPU 121 leverages the thousands of cores to perform read and write operations in a massively parallel fashion. Taking advantage of the parallel computing elements of the GPU 121 allows the behavior recognition system 100 to better process large amounts of incoming data (e.g., input from a video and/or audio source). As a result, the behavior recognition system 100 may scale with relatively less difficulty.

The sensor management module 130 provides one or more data collector components. Each of the collector components is associated with a particular input data source, e.g., a video source, a SCADA (supervisory control and data acquisition) source, an audio source, etc. The collector components retrieve (or receive, depending on the sensor) input data from each source at specified intervals (e.g., once a minute, once every thirty minutes, once every thirty seconds, etc.). The sensor management module 130 controls the communications between the data sources. Further, the sensor management module 130 normalizes input data and sends the normalized data to the sensory memory component 135.

The sensory memory component 135 is a data store that transfers large volumes of data from the sensor management module 130 to the machine learning engine 140. The sensory memory component 135 stores the data as records. Each record may include an identifier, a timestamp, and a data payload. Further, the sensory memory component 135 aggregates incoming data in a time-sorted fashion. Storing incoming data from each of the data collector components in a single location where the data may be aggregated allows the machine learning engine 140 to process the data efficiently. Further, the computer system 115 may reference data stored in the sensory memory component 135 in generating alerts for anomalous activity. In one embodiment, the sensory memory component 135 may be implemented in via a virtual memory file system in the memory 123. In another embodiment, the sensory memory component 135 is implemented using a key-value share.

The machine learning engine 140 receives data output from the sensor management module 135. Generally, components of the machine learning engine 140 generate a linguistic representation of the normalized vectors. As described further below, to do so, the machine learning engine 140 clusters normalized values having similar features and assigns a distinct symbol to each cluster, The machine learning engine 140 may then identify recurring combinations of symbols (i.e., words) in the data. The machine learning engine 140 then similarly identifies recurring combinations of words (i.e., phrases) in the data.

Note, however, FIG. 1 illustrates merely one possible arrangement of the behavior recognition system 100. For example, although the input data sources 105 are shown connected to the computer system 115 via network 110, the network 110 is not always present or needed (e.g., an input source such as a video camera may be directly connected to the computer system 115).

Figure 2:
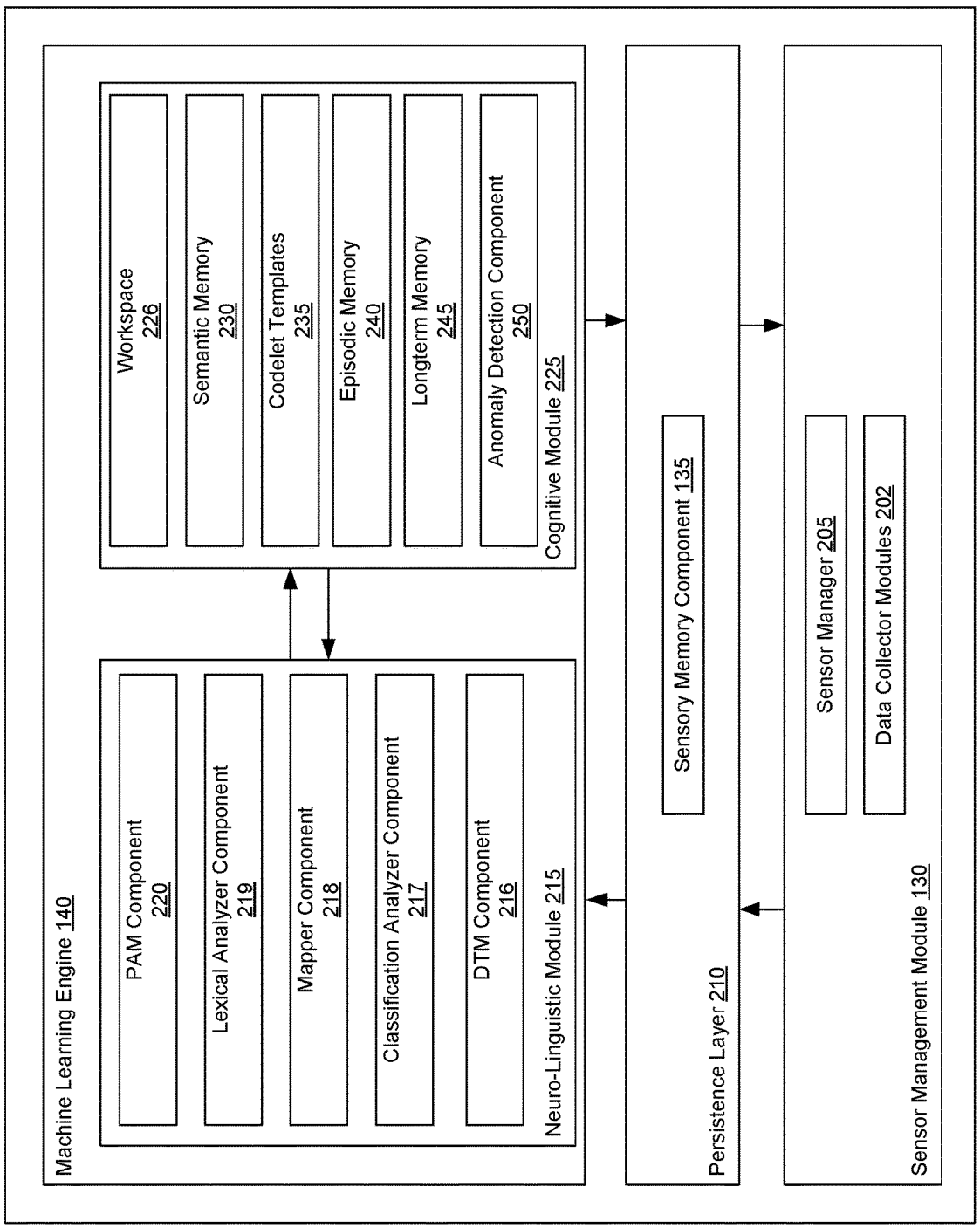
FIG. 2 illustrates a system architecture of a neuro-linguistic behavior recognition system, according to one embodiment.

FIG. 2 illustrates a system architecture of the behavior recognition system, according to one embodiment. As shown, the sensor management module 130 and the machine learning engine 140 communicate via a persistence layer 210.

The persistence layer 210 includes multiple data stores that maintain information used by components of the computer system 115. For example, the persistence layer 210 includes data stores that maintain information describing properties of the data collector modules 202, system properties (e.g., serial numbers, available memory, available capacity, etc. of the computer system 115), and properties of the source driver (e.g., active plug-ins 118, active sensors associated with each data source, normalization settings, etc.). Other data stores may maintain learning model information, system events, and behavioral alerts. In addition, the sensory memory component 135 resides in the persistence layer 210.

The machine learning engine 140 itself includes a neuro-linguistic module 215 and a cognitive module 225. The neuro-linguistic module 215 performs neural network-based linguistic analysis of normalized input data to build a neuro-linguistic model of the observed input data. The behavior recognition system can use the linguistic model to describe subsequently observed activity. However, rather than describing the activity based on predefined objects and actions, the neuro-linguistic module 215 develops a custom language based on symbols, words, and phrases generated from the input data. As shown, the neuro-linguistic module 215 includes a data transactional memory (DTM) component 216, a classification analyzer component 217, a mapper component 218, a lexical analyzer component 219, and a perceptual associative memory (PAM) component 220.

In one embodiment, the DTM component 216 retrieves the normalized vectors of input data from the sensory memory component 135 and stages the input data in the pipeline architecture provided by the GPU 121. The classification analyzer component 217 evaluates the normalized data organized by the DTM component 216 and maps the data on a neural network. In one embodiment, the neural network is a combination of a self-organizing map (SOM) and an adaptive resonance theory (ART) network.

The mapper component 218 clusters the data streams based on values occurring repeatedly in association with one another. Further, the mapper component 218 generates a set of clusters for each input feature. For example, assuming that the input data corresponds to video data, features may include location, velocity, acceleration, etc. The mapper component 218 would generate separate sets of clusters for each of these features. The mapper component 218 identifies symbols (i.e., builds an alphabet of letters) based on the clustered input data. Specifically, the mapper component 218 determines a statistical distribution of data in each cluster. For instance, the mapper component 218 determines a mean, variance, and standard deviation for the distribution of values in the cluster. The mapper component 218 also updates the statistics as more normalized data is received. Further, each cluster may be associated with a statistical significance score. The statistical significance for a given cluster increases as more data is received which maps to that cluster. In addition, the mapper component 218 decays the statistical significance of the cluster as the mapper component 218 observes data mapping to the cluster less often over time.

In one embodiment, the mapper component 218 assigns a set of symbols to clusters having a relatively high statistical significance score. A cluster has statistical significance if a threshold amount of input data mapping to that cluster is exceeded. A symbol may be described as a letter of an alphabet used to create words used in the neuro-linguistic analysis of the input data. A symbol provides a "fuzzy" representation of the data belonging to a given cluster.

Further, the mapper component 218 is adaptive. That is, the mapper component 218 may identify new symbols corresponding to new clusters generated from the normalized data, as such clusters are reinforced over time (resulting in such clusters reaching a level of statistical significance relative to the other clusters that emerge from the input data). The mapper component 218 learns on-line and may merge similar observations to a more generalized symbol. The mapper component 218 may assign a set of distinct symbols to the resulting cluster.

Once a cluster has reached statistical significance (i.e., data observed as mapping to that cluster has reached a threshold amount of points), the mapper component 218 begins sending corresponding symbols to the lexical analyzer component 219 in response to normalized data that maps to that cluster. In one embodiment, the mapper component 218 limits symbols that can be sent to the lexical component 219 to the most statistically significant clusters. In practice, outputting symbols (e.g., letters) assigned to the top thirty-two clusters has shown to be effective. However, other amounts may also prove effective, such as the top sixty-four or 128 most frequently recurring clusters. Note, over time, the most frequently observed symbols may change as different clusters increase in statistical significance. As such, it is possible for a given cluster to lose statistical significance. Over time, thresholds for statistical significance of a cluster can increase, and thus, if the amount of observed data mapping to a given cluster fails to meet a threshold, then the cluster loses statistical significance.

In one embodiment, the mapper component 218 evaluates an unusualness score for each symbol. The unusualness score is based on the frequency of a given symbol relative to other symbols observed. The unusualness score may increase or decrease over time as the neuro-linguistic module 215 receives additional data.

The mapper component 218 sends a stream of the symbols (e.g., letters), timestamp data, unusualness scores, and statistical data (e.g., a representation of the cluster associated with a given symbol) to the lexical analyzer component 219. The lexical analyzer component 219 builds a dictionary based on symbols output from the mapper component 218. In practice, the mapper component 218 may need approximately 5000 observations (i.e., normalized vectors of input data) to generate a stable alphabet of symbols.

The lexical analyzer component 219 builds a dictionary that includes combinations of co-occurring symbols, e.g., words, from the symbols transmitted by the mapper component 218. The lexical analyzer component 219 identifies repeating co-occurrences of letters output from the mapper component 218 and calculates frequencies of the co-occurrences throughout the symbol stream. The combinations of symbols may semantically represent a particular activity, event, etc.

In one embodiment, the lexical analyzer component 219 limits the length of words in the dictionary to allow the lexical analyzer component 219 to identify a number of possible combinations without adversely affecting the performance of the computer system 115. Further, the lexical analyzer component 219 may use level-based learning models to analyze symbol combinations and learn words. As will be further described below, the lexical analyzer component 219 learns words up through a maximum symbol combination length at incremental levels, i.e., where one-letter words are learned at a first level, two-letter words are learned at a second level, and so on. In practice, limiting a word to a maximum of five or six symbols (i.e., learning at a maximum of five or six levels) has shown to be effective.

Like the mapper component 218, the lexical analyzer component 219 is adaptive. That is, the lexical analyzer component 219 may learn and generate words in the dictionary over time. The lexical analyzer component 219 may also reinforce or decay the statistical significance of words in the dictionary as the lexical analyzer component 219 receives subsequent streams of symbols over time. Further, the lexical analyzer component 219 may determine an unusualness score for each word based on how frequently the word recurs in the data. The unusualness score may increase or decrease over time as the neuro-linguistic module 215 processes additional data.

In addition, as additional observations (i.e., symbols) are passed to the lexical analyzer component 219 and identified as a given word, the lexical analyzer component 219 may determine that the word model has matured. Once a word model has matured, the lexical analyzer component 219 may output observations of those words in the model to the PAM component 220. In one embodiment, the lexical analyzer component 219 limits words sent to the PAM component 220 to the most statistically significant words. In practice, for each single sample, outputting occurrences of the top thirty-two of the most frequently occurring words has shown to be effective (while the most frequently occurring words stored in the models can amount to thousands of words). Note, over time, the most frequently observed words may change as the observations of incoming letters change in frequency (or as new letters emerge by the clustering of input data by the mapper component 218.

Once the lexical analyzer component 219 has built the dictionary (i.e., identifies words that have reached a predefined statistical significance), the lexical analyzer component 219 sends occurrences of words subsequently observed in the input stream to the PAM component 220. The PAM component 220 builds a syntax of phrases from the words output by the lexical analyzer component 319. In practice, lexical analyzer component 219 may build a useful dictionary of words after receiving approximately 15,000 observations (i.e., input letters from the mapper component 218).

The PAM component 220 identifies a syntax of phrases based on the sequence of words output from the lexical analyzer component 219. Specifically, the PAM component 220 receives the words identified by the lexical analyzer component 219 generates a connected graph, where the nodes of the graph represent the words, and the edges represent a relationship between the words. The PAM component 220 may reinforce or decay the links based on the frequency that the words are connected with one another in a data stream.

Similar to the mapper component 218 and the lexical analyzer component 219, the PAM component 220 determines an unusualness score for each identified phrase based on how frequently the phrase recurs in the linguistic data. The unusualness score may increase or decrease over time as the neuro-linguistic module 215 processes additional data.

Similar to the lexical analyzer component 219, the PAM component 220 may limit the length of a given phrase to allow the PAM component 220 to be able to identify a number of possible combinations without adversely affecting the performance of the computer system 115.

The PAM component 220 identifies syntax phrases over observations of words output from the lexical analyzer component 219. As observations of words accumulate, the PAM component 220 may determine that a given phrase has matured, i.e., a phrase has reached a measure of statistical significance. The PAM component 220 then outputs observations of that phrase to the cognitive module 225. The PAM component 220 sends data that includes a stream of the symbols, words, phrases, timestamp data, unusualness scores, and statistical calculations to the cognitive module 325. In practice, the PAM component 220 may obtain a meaningful set of phrases after observing about 5000 words from the lexical analyzer component 219.

After maturing, the generated letters, words, and phrases form a stable neuro-linguistic model of the input data that the computer system 115 uses to compare subsequent observations of letters, words, and phrases against the stable model. The neuro-linguistic module 215 updates the linguistic model as new data is received. Further, the neuro-linguistic module 215 may compare a currently observed syntax to the model. That is, after building a stable set of letters, the neuro-linguistic module 215 may build a stable model of words (e.g., a dictionary). In turn, the neuro-linguistic module 215 may be used to build a stable model of phrases (e.g., a syntax). Thereafter, when the neuro-linguistic module 215 receives subsequently normalized data, the module 215 can output an ordered stream of symbols, words, and phrases, all of which can be compared to the stable model to identify interesting patterns or detect deviations occurring in the stream of input data.

As shown, the cognitive module 226 includes a workspace 226, a semantic memory 230, codelet templates 235, episodic memory 240, long term memory 245, and an anomaly detection component 250.

In one embodiment, the workspace 226 provides a computational engine for the machine teaming engine 140. For example, the workspace 226 may retrieve linguistic data having statistical relevance (e.g., phrases that occur frequently in the data) from the episodic memory 240 and the long term memory 245, select codelet templates 235 to execute, etc. Further, the workspace 326 receives the symbols, words, and phrases (as well as unusualness scores) from the neuro-linguistic module 215 and stores these data in the semantic memory 230.

The workspace 226 retrieves the neuro-linguistic data from semantic memory 230 and disseminates this data to different portions of the cognitive module 225 as needed.

The episodic memory 240 stores linguistic observations related to a particular episode in the immediate past and may encode specific details, such as the "what" and the "when" of a particular event.

The long-term memory 245 stores generalizations of the linguistic data with particular episodic details stripped away. In this way, when a new observation occurs, memories from the episodic memory 240 and the long-term memory 245 may be used to relate and understand a current event, i.e., the new event may be compared with past experience (as represented by previously observed linguistic data), leading to both reinforcement, decay, and adjustments to the information stored in the long-term memory 245, over time. In a particular embodiment, the long-term memory 245 may be implemented as an ART network and a sparse-distributed memory data structure. Importantly, however, this approach does not require events to be defined in advance.

The codelet templates 235 provide a collection of executable codelets, or small pieces of code that evaluate different sequences of events to determine how one sequence may follow (or otherwise relate to) another sequence. More generally, a codelet may detect interesting patterns from the linguistic representation of input data. For instance, a codelet may compare a current observation (i.e., a current phrase instance with what has been observed in the past) with previously observed activity stored in the semantic memory 230. By repeatedly scheduling codelets for execution, copying memories and percepts to/from the workspace 226, the cognitive module 225 performs a cognitive cycle used to observe, and learn, about patterns of behavior that occur within the linguistic data.

The anomaly detection component 250 evaluates unusualness scores sent by the neuro-linguistic module 215 to determine whether to issue an alert in response to some abnormal activity indicated by the unusualness scores. Specifically, the anomaly detection component 250 is provides probabilistic histogram models (e.g., an unusual lexicon model, an unusual syntax model, and an unusual model) which represent the unusualness scores. The anomaly detection component 250 may send alert data to an output device, where an administrator may view the alert, e.g., via a management console.

The cognitive module 225 performs learning analysis on the linguistic content delivered to semantic memory 230 (i.e., the identified symbols, words, phrases) by comparing new observations to the learned patterns kept in semantic memory 230 and then estimating the rareness of these new observations.

Specifically, the anomaly component 250 evaluates the unusualness scores of each of the symbols, words, and phrases to identify abnormal occurrences in the observed data. Once an anomalous observation has been identified, the anomaly component may issue an alert (e.g., notify an administrator or user of the computer system 115).

Figure 3:
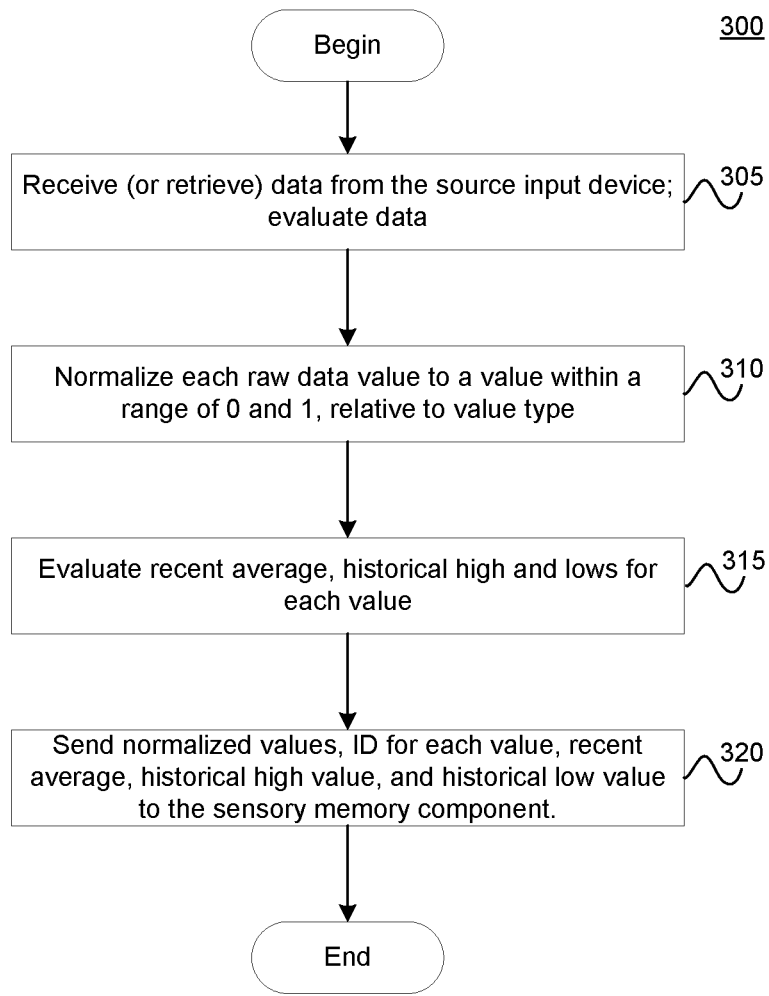
FIG. 3 illustrates a method for collecting sensor data for use in a neuro-linguistic behavior recognition system, according to one embodiment.

FIG. 3 illustrates a method 300 for collecting sensor data for use in a neuro-linguistic behavior recognition system, according to one embodiment. More specifically, method 300 describes how a data collector retrieves data from an associated input device and sends the data to the neuro-linguistic module 215. To better describe the method 300, assume that a data collector module 202 for a video source carries out the steps of the method. Of course, the method 300 may be applicable for other types of data collector components 202.

Method 300 begins at step 305, where the data collector module 202 retrieves data from the source input device. In this case, the data collector module 202 may retrieve video frames from a video source, such as a video camera positioned to observe a particular location, such as a hotel lobby. Further, the data collector module 202 identifies data values to send to the sensory memory component 135. To do so, the data collector module 202 may evaluate the video frames to separate foreground objects from background objects, measure appearance and kinematic information of the identified foreground objects, and track foreground objects moving across the scene (i.e., the field of view of the camera). As a result, the data collector module 202 ascertains values to be sent to the sensory memory component 135, such as values for the appearance and kinematic information.

At step 310, the data collector module 202 normalizes each data value to a numerical value falling within a range, e.g., between 0 to 1, inclusive, relative to the type of that data value. For example, values associated with kinematic features are normalized from 0 to 1 relative to other values associated kinematic features. Doing so results in each value being converted to a common format that allows the neuro-linguistic module 215 to recognize recurring events in the video stream.

After normalizing the values, at step 315, the data collector module 202 identifies additional data associated with the normalized values, such as a timestamp of a given value, an average associated with the data type (e.g., kinematic features, appearance features, location, position, etc.) of the value, and historical high and low values for that data type. Doing so allows the data collector module 202 to readjust the normalization in the event that the video source is modified. Specifically, the data collector module 202 references the identified historical values and averages to readjust the normalization.

At step 320, the data collector module 202 sends a vector of the normalized values and associated data to the sensory memory component 135. As stated, the sensory memory component 135 stores the normalized values and associated data. The neuro-linguistic module 215 may then retrieve the normalized values from the sensory memory component 135 and perform linguistic analysis thereafter.

Figure 4:
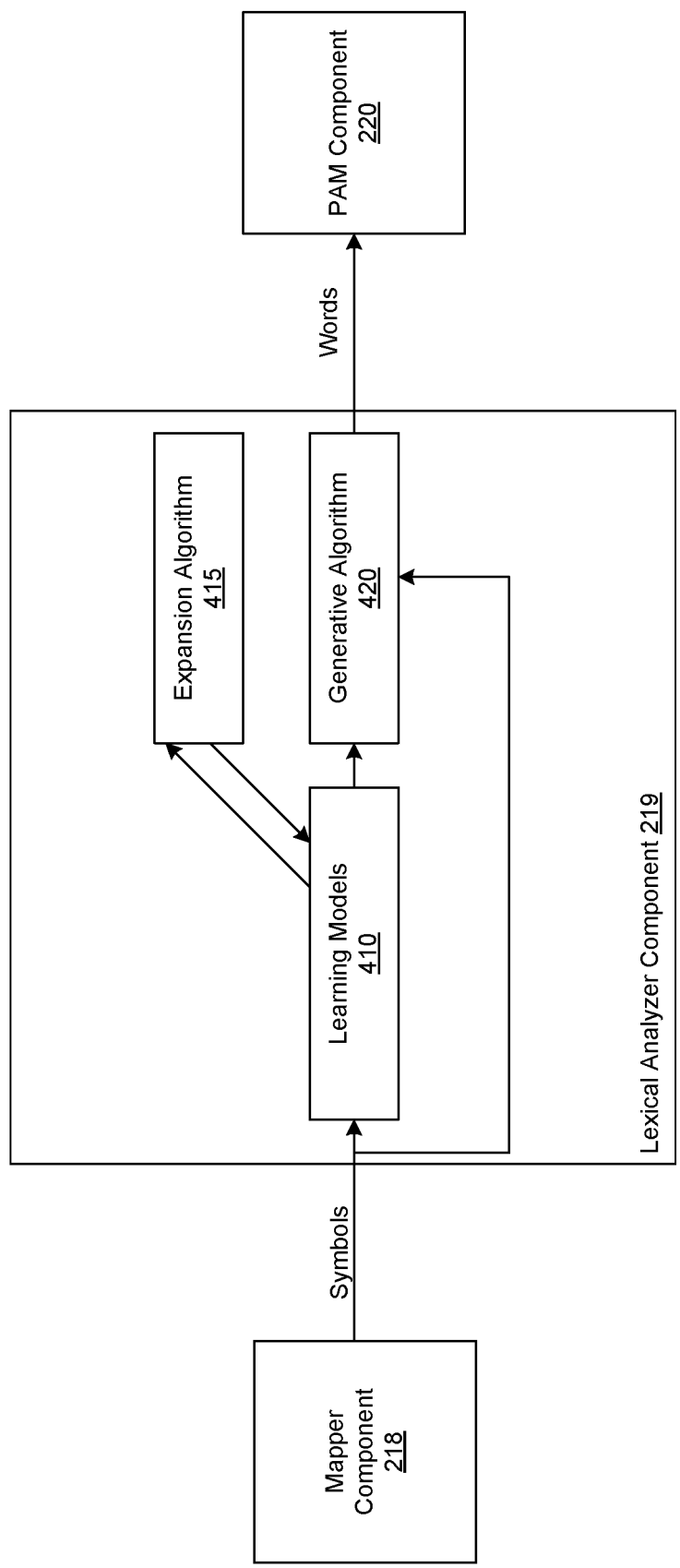
FIG. 4 further illustrates the lexical analyzer component described in FIG. 2, according to one embodiment.

FIG. 4 further illustrates the lexical analyzer component described in FIG. 2, according to one embodiment. As stated, the mapper component 219 generates a stream of symbols based on data sent from a given source (e.g., a video source). Illustratively, the mapper component 218 sends the stream of symbols to the lexical analyzer component 219. The lexical analyzer component 219 builds a dictionary of words, i.e., combinations of symbols, based on statistical frequencies of groups of symbols appearing in the stream.

The lexical analyzer component 219 outputs statistically significant words to the PAM component 220.

As shown, the lexical analyzer component 219 itself includes learning models 410, an expansion algorithm 415, and a generative algorithm 420. As noted, the mapper component 218 sends a stream of symbols to the lexical analyzer component 219. As the symbol stream is received, the lexical analyzer component 219 inputs the symbols to the learning models 410. Learning models 410 provide a hierarchical scheme for evaluating the symbols to build a dictionary of words. That is, the learning models 410 provide levels at which the lexical analyzer component 219 identifies statistically relevant words.

At an initial level, the lexical analyzer component 219 identifies one-symbol words having a statistical significance score that exceeds a given threshold. In one embodiment, the lexical analyzer component 219 determines which words to include in the dictionary based on the statistical significance score. The statistical significance score also allows the lexical analyzer component 219 to determine which combinations of symbols to further evaluate in higher-level learning models. In addition, the lexical analyzer component 219 determines which words to consider when generating a statistical model based on the statistical significance score. Once the one-symbol words are identified, the lexical analyzer component 219 advances to the next level to identify combinations having a two symbol length, using the one symbol words that have a statistical significance score exceeding a threshold. To do so, the lexical analyzer component 219 invokes the expansion algorithm 415 and provides the statistically significant one-symbol words to the learning model 410 as input. The second level learning model 410 derives the two-symbol words from the one-symbol words. The lexical analyzer component 219 determines the statistically significant two-symbol words and again increments the level to derive three-symbol words in a similar manner. The lexical analyzer component 219 continues learning words in such a manner for each level up through the highest level, where lexical analyzer component 219 learns words having a maximum length. As stated, a maximum length of five has shown to be effective in practice. Therefore, in such a case, the highest level is the fifth level.

In one embodiment, the lexical analyzer component 219 generates a feature model that includes a generalization of the previously identified words. Specifically, the lexical analyzer component 219 identifies features of specific symbols in each word. The lexical analyzer component 219 may then abstract the symbol combinations based on the identified features. Generating the feature model allows the lexical analyzer component 219 to evaluate a statistical significance of general combinations of symbols in addition to specific combinations. Further, the feature model allows the lexical analyzer component 219 to identify abnormal symbols from observed feature combinations.

In one embodiment, the lexical analyzer component 219 invokes the generative algorithm 420 to generate known words having statistical significance, relative to the input symbol stream from the mapper. The generative algorithm 420 outputs the dictionary, symbols, and associated statistics to the PAM component 220. As stated, the PAM component 220 generates a syntax from the dictionary. The PAM component 220 identifies phrases from words commonly recurring relative to one another. The collective symbols, words, and phrases provide a linguistic model of the input data that allows the behavior recognition system to learn, understand, and analyze the data without any preconceptions of the input data prior to initialization.

Figure 5:
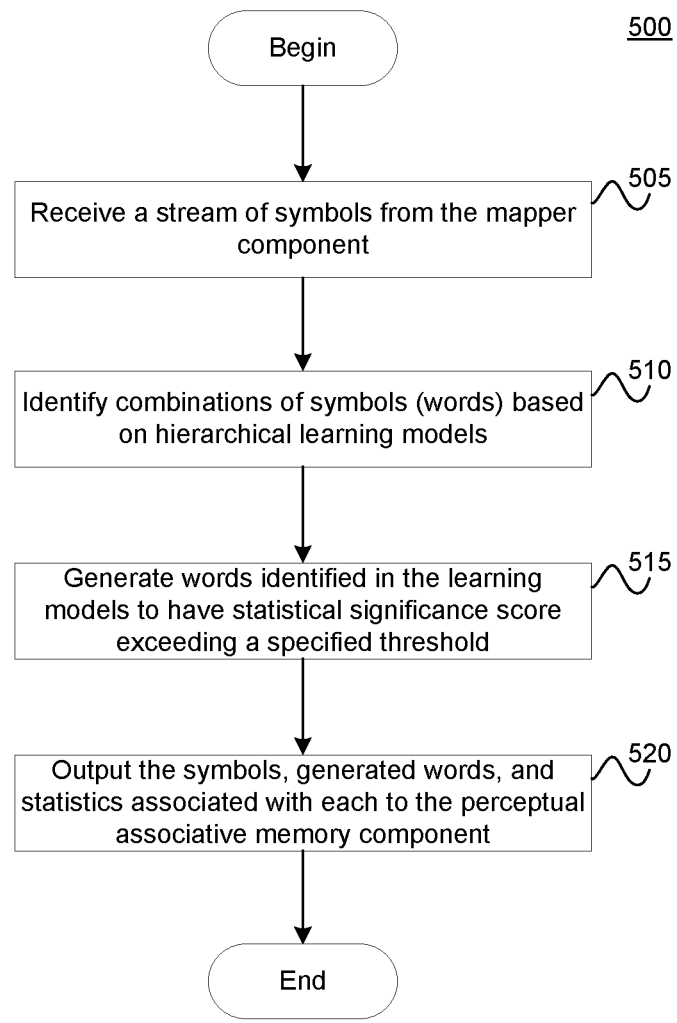
FIG. 5 illustrates a method for processing symbols representing input data, according to one embodiment.

FIG. 5 illustrates a method for processing symbols generated from input data, according to one embodiment. Method 500 begins at step 505, where the lexical analyzer component 219 receives a stream of symbols from the mapper component 218. As stated, each symbol is assigned to a cluster of normalized numerical values representing data input from a source (e.g., a video source, network security source, etc.). Thus, combinations of symbols observed in the stream can represent words used to describe the data.

At step 510, the lexical analyzer component 219 identifies the words based on hierarchical learning models 410. Each level of the learning model 410 corresponds to a length of words to be identified from the symbol stream. At each level, the lexical analyzer component 219 evaluates statistics of each identified word, such as a frequency at which the word appears in the symbol stream. The lexical analyzer component 219 uses such statistics to identify a statistical significance score of each candidate word at a given level. Step 510 is further described relative to FIG. 6.

At step 515, the lexical analyzer component 219 generates occurrences of words based on statistically significant feature patterns identified in the learning models 410 as having a statistical significance score exceeding a given threshold, relative to the complete set of possible candidate feature patterns abstracted out of the input symbol stream. For example, assume that the lexical analyzer component 219 frequently observes a given word pattern, namely, a feature pattern. Such a pattern is likely to have a statistical significance score that exceeds the threshold. A more detailed example is provided relative to FIGS. 7A, 7B, and 7C. In this case, the lexical analyzer component 219 generates that word pattern when observed in the symbol stream. At step 520, the lexical analyzer component 219 outputs the symbols, generated words, and statistics (e.g., statistical significance scores, unusualness scores, occurrence frequencies, timestamps, etc.) to the PAM component 220. The PAM component 220 derives phrases from the words used to further describe the input data.

Figure 6:
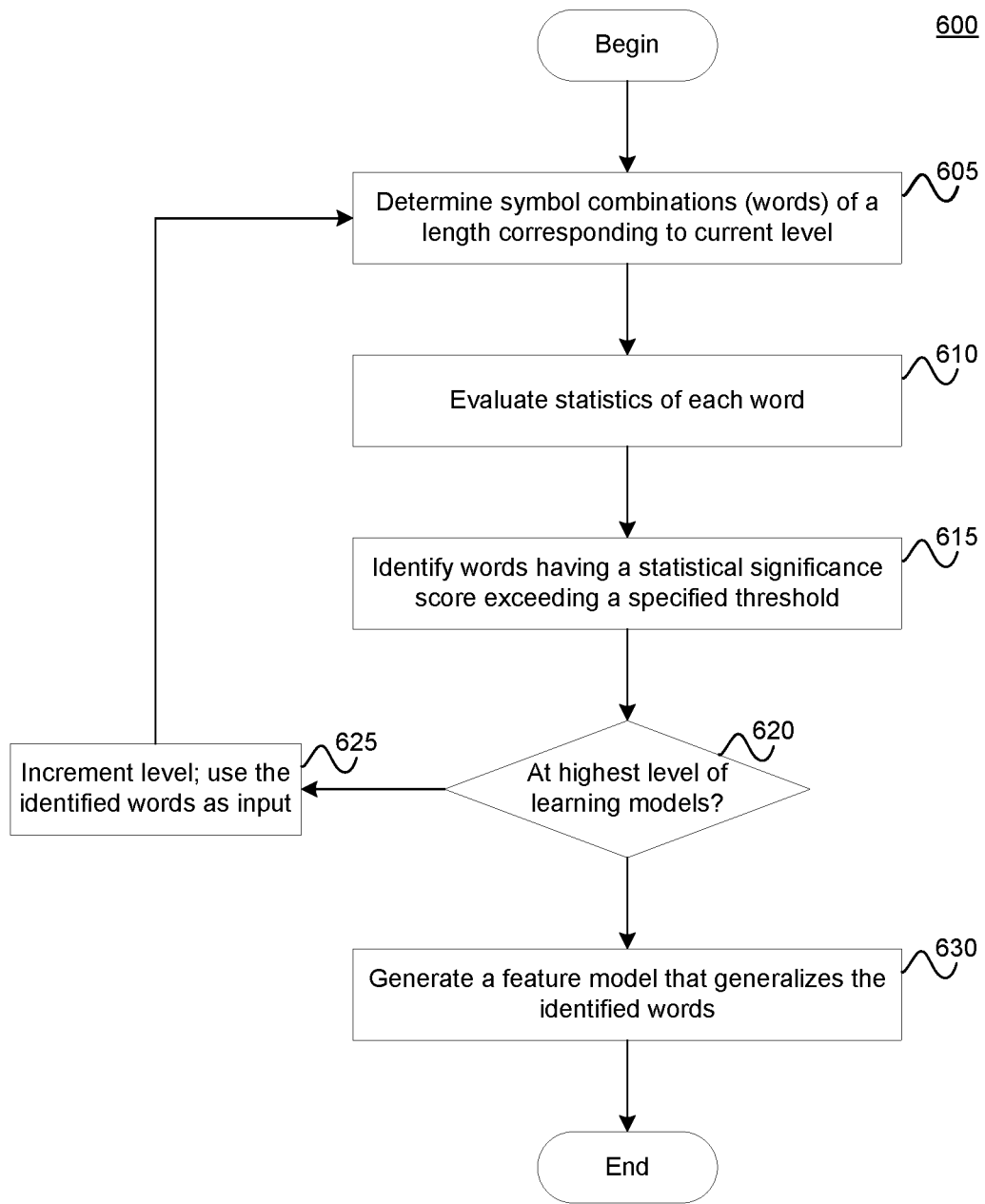
FIG. 6 illustrates a method for building a dictionary of words from a stream of symbols representing input data, according to one embodiment.

FIG. 6 illustrates a method 600 for building a dictionary of words from a stream of symbols representing input data, according to one embodiment. More specifically, method 600 describes hierarchical learning of symbol combinations. Method 600 begins at step 605, where the lexical analyzer component 219 determines words, i.e., combinations of symbols, of a length corresponding to a current level of a learning model 410. As stated, the level of a learning model 410 indicates a particular length of words to identify at that level. For example, at a first level, the lexical analyzer component 219 may identify words having a length of one symbol. At a fifth level, the lexical analyzer component 219 may identify words having a length of five. In practice, learning models 410 having five levels have proven to be effective.

At step 610, the lexical analyzer component 219 evaluates the statistics of each word as the word occurs in a current input window. Such statistics may include frequency of occurrence in the stream. Doing so allows the lexical analyzer component 219 to identify the most common (and uncommon) words from the complete combinatory possibilities presented by the input stream. The most common words are subsequently generalized to identify the most common combination of features. The combinations of features are used in the generative algorithm 420 to generate specific and unknown words matching such patterns by the lexical analyzer component 219. Further, the lexical analyzer component 219 may reinforce, i.e., update statistics for words previously identified.

In one embodiment, the lexical analyzer component 219 evaluates a statistical significance score of each candidate word observed for the current input window. The statistical significance score may be based on how often the lexical analyzer component 219 observes a given word. The lexical analyzer component 219 uses the statistical significance score of each word to determine an unusualness score to be output to the PAM component 220 when observed in the symbol stream. That is, the lexical analyzer component 219 outputs words observed in the input stream accompanied by a specified statistical significance score.

Similarly, the lexical analyzer component 219 evaluates an unusualness score of each word based on how frequently the lexical analyzer component 219 observes a word in the symbol stream. A high unusualness score indicates that the word is infrequently observed in the symbol stream. The lexical analyzer component 219 determines the unusualness score based on how frequently the specific word is observed in the historical data.

At step 615, the lexical analyzer component 219 identifies words having a statistical significance. A word may have statistical significance if the lexical analyzer component 219 has observed the word relatively frequently in the input stream of symbols. The statistical significance may be based on a frequency that the word occurs relative to other identifiable words based on a maximum size of a dictionary. As stated, the lexical analyzer component 219 determines which words to output to the PAM component 220 based on identified feature patterns having statistical significance (i.e., patterns observed frequently in the symbol stream). For example, the lexical analyzer component 219 may determine that a feature pattern often observed in the symbol stream may have a statistical significance score that exceeds the threshold.

At step 620, the lexical analyzer component 219 determines whether the highest level has been reached. If not, then the lexical analyzer component 219 increments the level by invoking the expansion algorithm 415. The lexical analyzer component 219 inputs the words identified to have a significance score exceeding the threshold to the next learning model 410. The lexical analyzer component 219 continues to perform steps 605 through 620 until the highest level of words have been identified.

At step 625, the lexical analyzer component 219 generates a feature model for the identified words. The feature model includes generalizations of the statistically significant words identified through the learning models 410. To generalize the words, the lexical analyzer component 219 identifies symbols in each word and abstracts each symbol into its general features. For example, assume that three features f1, f2 and f3 are identified by the mapper component 218. Further, each feature has two symbols associated, such that f1={A, B}, f2={C,D}, and f3={E, F}. Assume that the lexical analyzer component 219 frequently observes the words AC, BC, and CE. As a result, the generalized feature combinations of AC is f1f2, BC is f1f2, and CD is f2f3. The generated feature model allows the lexical analyzer component 219 to evaluate the statistics of generalized words occurring in the input stream. In addition, the feature model allows the lexical analyzer component 219 to identify anomalous words. For example, AD, BD, and DF map to feature combinations f1f2, f1f2, and f2f3, respectively, but may nonetheless be anomalous if not frequently observed.

Figure 7A:
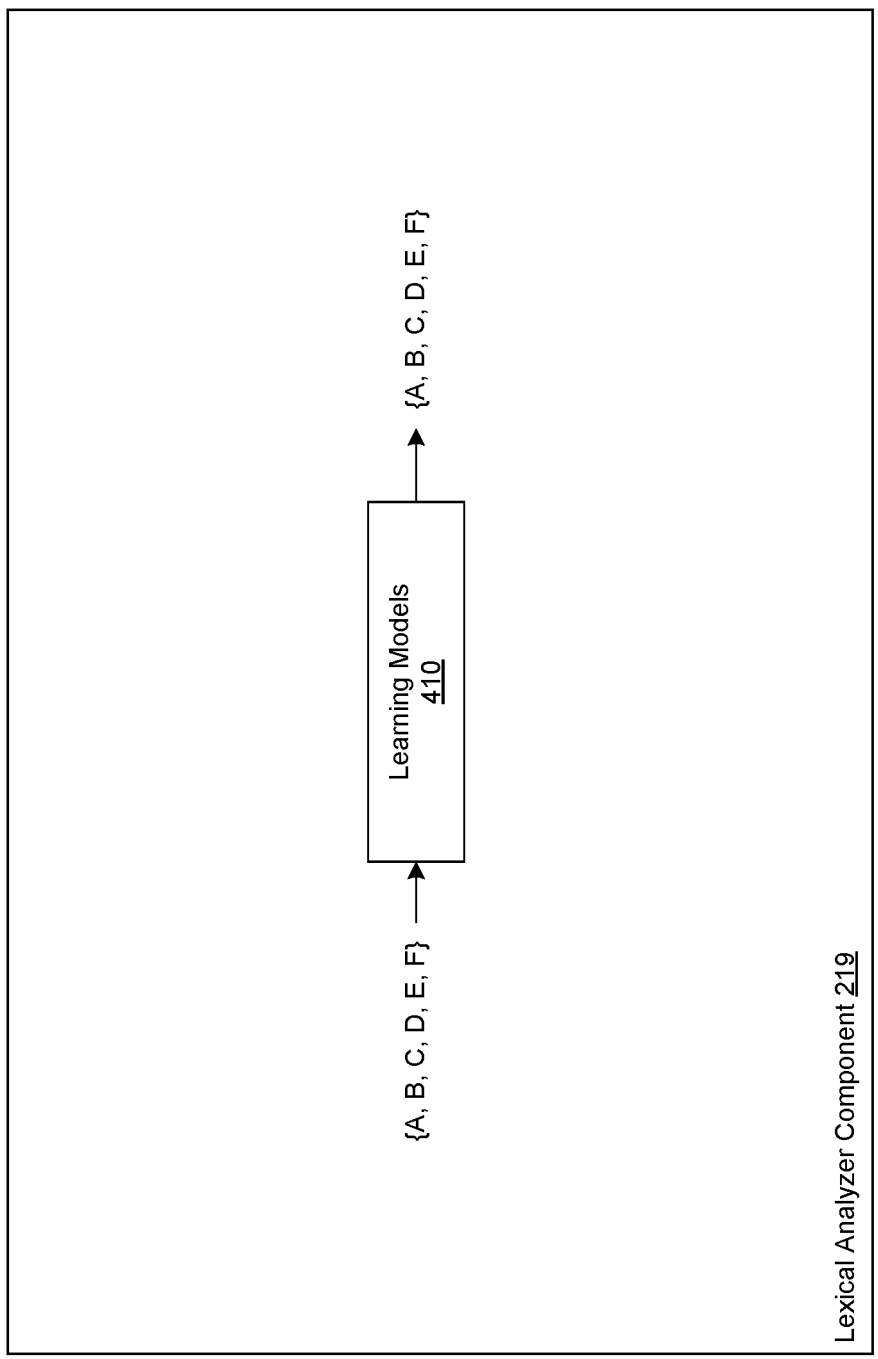
FIGS. 7A, 7B, and 7C illustrate different levels of learning by the lexical analyzer component described in FIG. 2, according to one embodiment.
Figure 7B:
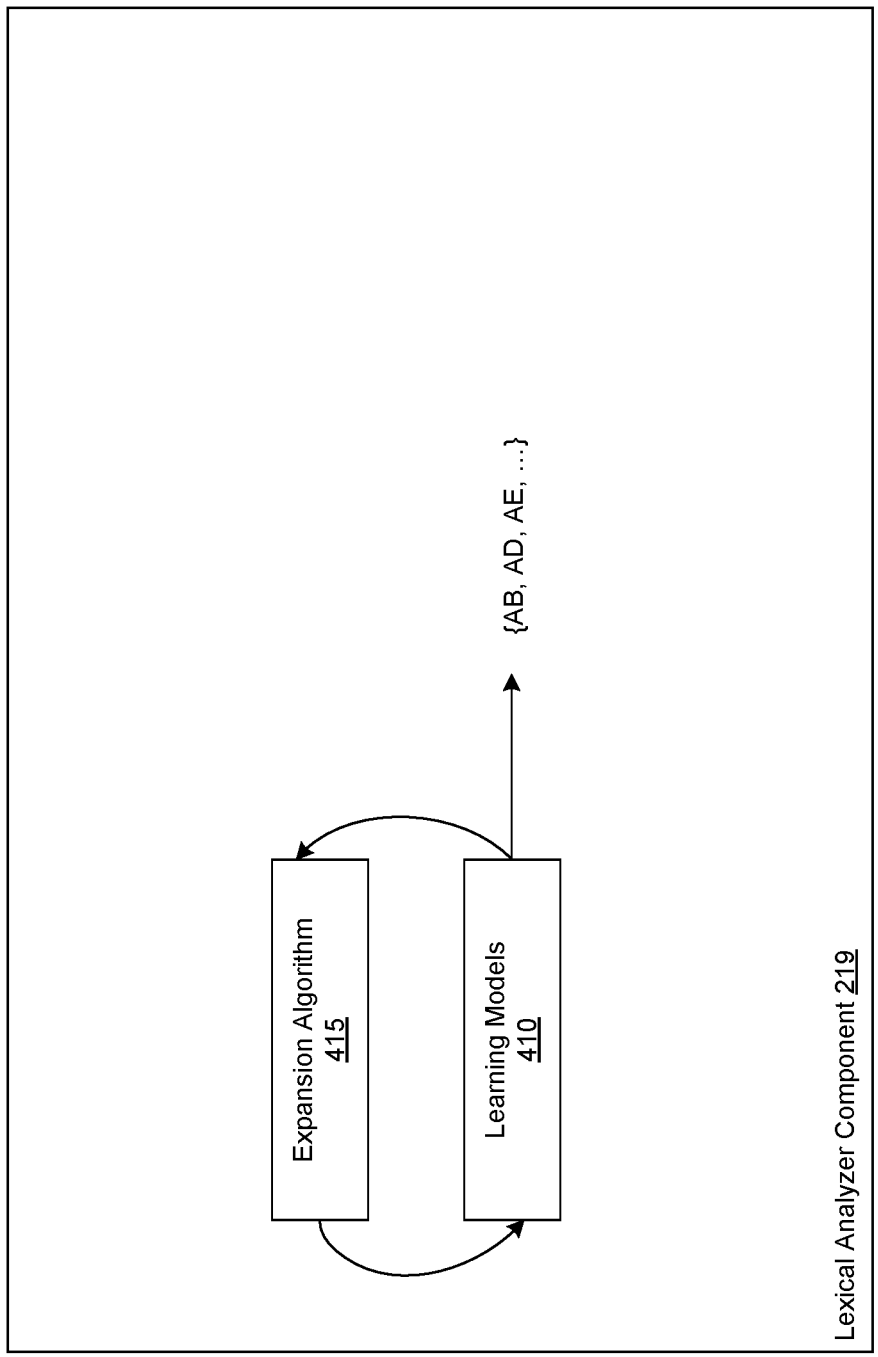
Figure 7C:
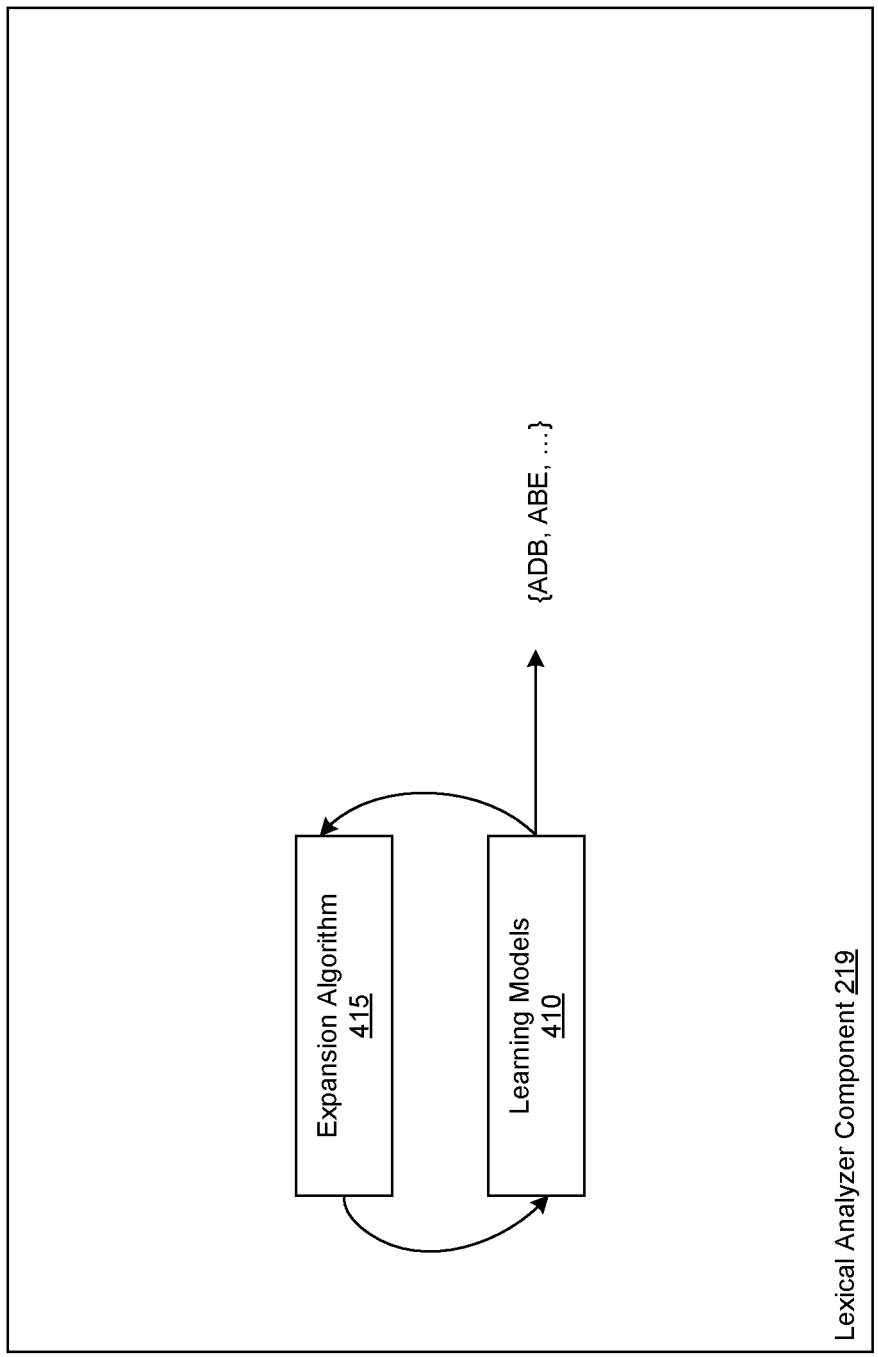

FIGS. 7A through 7C illustrate examples of the lexical analyzer component 219 learning words at different levels, according to one embodiment. For instance, FIG. 7A illustrates an example of the lexical analyzer component 219 learning words at a first level. Illustratively, a stream of symbols {A, B, C, D, E, F} is passed into the learning models 410. At the first level, the lexical analyzer component 219 identifies simple words having a length of one symbol. Illustratively, resulting output from the learning models 410 are words A, B, C, D, E, and F.

Further, FIG. 7B illustrates the lexical analyzer component 219 identifying words based on a second level of the learning models 410. In such an example, the lexical analyzer component 219 identifies words having a length of two symbols. To do so, the lexical analyzer component 219 invokes the expansion algorithm 415 using the statistically significant words identified at the lower level as input, i.e., the words A, B, C, D, E, and F. Illustratively, the lexical analyzer component 219 identifies, via the learning models 410, a resulting set of statistically significant words, e.g., AB, AD, AE, and so on. That is, the learning model, at the second level, identifies all sensible combinations from the one-letter words and evaluates the frequency of the combinations occurring in the stream. That is, the expansion algorithm determines whether a combination could be viable based on mathematical consistency criteria. Frequently occurring words have statistical significance. At each level, each statistically significant word represents a more complex term than the words identified at the lower level.

Continuing the example, FIG. 7C illustrates the lexical analyzer component 219 identifying words based on a third level of the learning models 410. In this example, the lexical analyzer component 219 identifies words having a length of two symbols, based on the input words from the first- and second-level learning models 410. The lexical analyzer component 219 invokes the expansion algorithm 415. Illustratively, the lexical analyzer component 219 identifies, via the learning models 410, a resulting set of statistically significant words, e.g., ADB, ABE, and so on. Each identified word represents a more complex term than the words identified at the lower levels.

Figure 8:
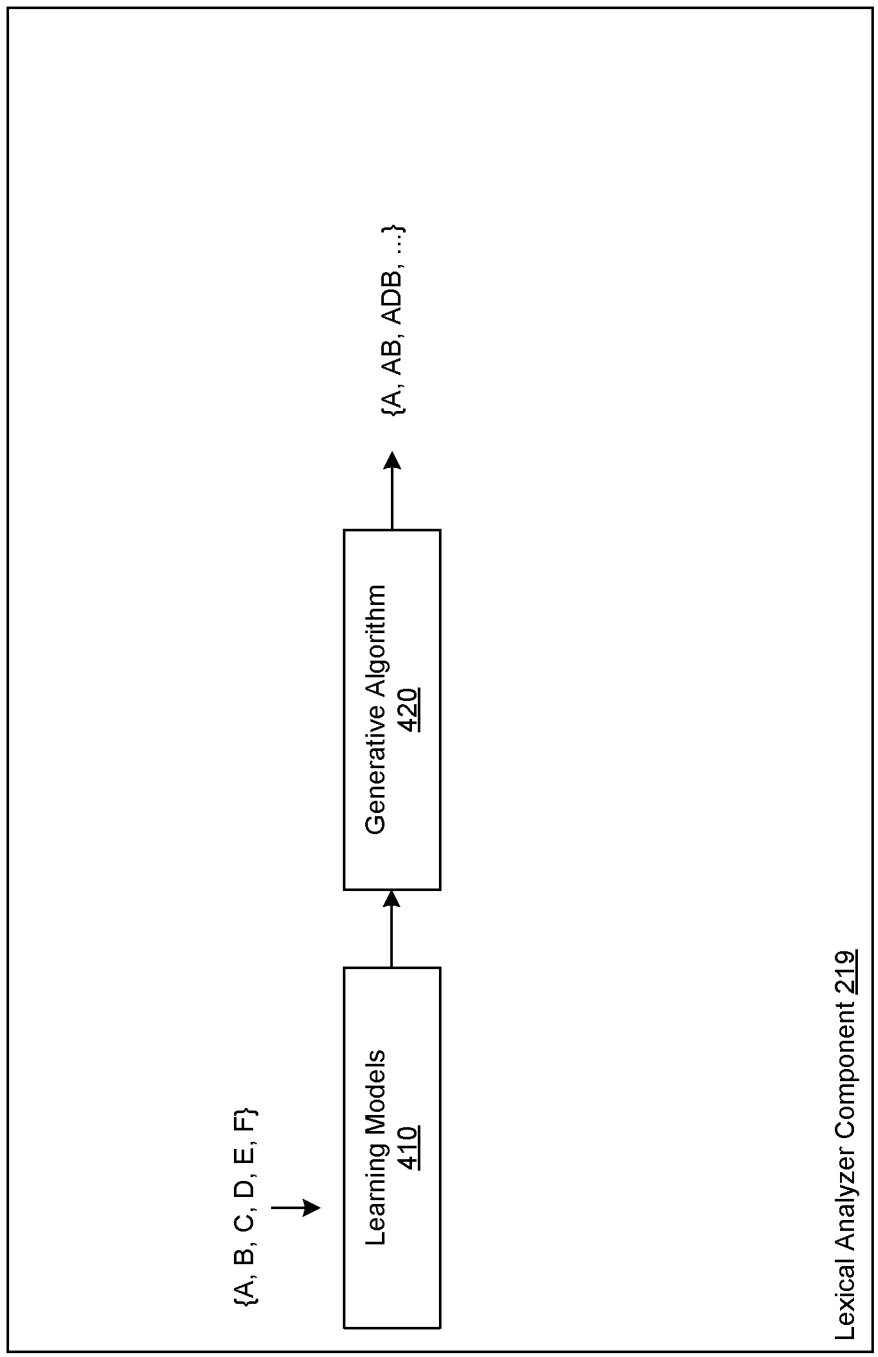
FIG. 8 illustrates an example of outputting words to a perceptual associative memory component, according to one embodiment.

FIG. 8 illustrates an example for outputting words to the perceptual associative memory component 220, according to one embodiment. As described, the mapper component 218 sends a stream of symbols to the lexical analyzer component 219. Illustratively, the lexical analyzer component 219 receives a stream of symbols {A, B, C, D, E, F}. The lexical analyzer component 219 determines statistically relevant words, i.e., combinations of symbols, through the hierarchical learning models 410. Once determined, the lexical analyzer component 219 invokes the generative algorithm 420.

In one embodiment, the generative algorithm 419 outputs the statistically relevant words, symbols, and associated statistics (e.g., statistical significance scores, frequencies, unusualness scores) to the PAM component 220. In this example, words {A, AB, ADB, . . . } are output.

One embodiment of the present disclosure is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present disclosure, are embodiments of the present disclosure. Other examples media include communications media through which information is conveyed to a computer, such as through a computer or telephone network, including wireless communications networks.

In general, the routines executed to implement the embodiments of the present disclosure may be part of an operating system or a specific application, component, program, module, object, or sequence of instructions. The computer program of the present disclosure is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the disclosure. However, it should be appreciated that any particular program nomenclature that follows is used merely for convenience, and thus the present disclosure should not be limited to use solely in any specific application identified and/or implied by such nomenclature.

As described, embodiments herein provide techniques for building a dictionary of words from symbols that represent data input from a source (e.g., video source, SCADA source, network security source, etc.) via a neuro-linguistic behavior recognition system. Once generated, the behavior recognition system establishes a syntax. The symbols, words, and syntax form the basis for a linguistic model used to describe input data observed by the behavior recognition system. The behavior recognition system analyzes and learns behavior based on the linguistic model to distinguish between normal and abnormal activity in observed data. Advantageously, this approach does not relying on predefined patterns to identify behaviors and anomalies but instead learns patterns and behaviors by observing a scene and generating information on what it observes.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving, via a processor and from a graphics processing unit (GPU), a first stream of symbols, each symbol from the first stream of symbols associated with a cluster of vectors generated from normalized data, the normalized data associated with a plurality of video frames that includes a representation of an object;
   identifying, via the processor, a plurality of statistically significant machine-readable words based on a hierarchical learning model having a plurality of levels, each level from the plurality of levels associated with a different word length, each machine-readable word from the plurality of machine-readable words representing a recurring combination of symbols from the first stream of symbols;
   calculating, via the processor, an unusualness score for each machine-readable word from the plurality of machine-readable words, to produce a plurality of unusualness scores, the calculating based on a statistical significance of that machine-readable word;
   evaluating, via the processor, machine-readable words in a second stream of symbols to identify unusualness scores, from the plurality of unusualness scores, for the machine-readable words in the second stream of symbols;
   identifying abnormal activity of the object based on the unusualness scores for the machine-readable words in the second stream of symbols; and
   in response to identifying the abnormal activity of the object, sending alert data including an indication of the abnormal activity to an output device.

2. The method of claim 1, further comprising, outputting a representation of the plurality of machine-readable words and statistics associated with each machine-readable word from the plurality of machine-readable words.

3. The method of claim 1, wherein, for each machine-readable word from the plurality of machine-readable words, the statistical significance for that machine-readable word is identified based on a frequency at which that machine-readable word is observed in the first stream of symbols.

4. The method of claim 1, wherein the plurality of machine-readable words is a first plurality of machine-readable words, the method further comprising:
   determining a second plurality of machine-readable words from combinations of the symbols in the second stream of symbols based on the hierarchical learning model; and
   updating, via the hierarchical learning model, statistics associated with the first plurality of machine-readable words based on the second plurality of machine-readable words.

5. The method of claim 1, further comprising generating a feature model from the plurality of machine-readable words the feature model including generalizations of the machine-readable words from the plurality of statistically significant machine-readable words.

6. The method of claim 1, further comprising generating a feature model based on the plurality of machine-readable words by:
   identifying features associated with the cluster of vectors associated with each symbol from the first stream of symbols; and
   generalizing one or more machine-readable words from the plurality of machine-readable words based on the features.

7. The method of claim 1, wherein the identifying the statistically significant plurality of machine-readable words is based on statistics associated with each candidate word from a plurality of candidate words.

8. A non-transitory computer-readable storage medium storing instructions that, when executed by a processor, cause the processor to:
   receive, from a graphics processing unit (GPU), a first stream of symbols, each symbol associated with a cluster of vectors generated from normalized data, the normalized data associated with a plurality of video frames that includes a representation of an object;
   identify a plurality of statistically significant machine-readable words based on a hierarchical learning model having a plurality of levels, each level from the plurality of levels associated with a different word length, each machine-readable word from the plurality of machine-readable words representing a recurring combination of symbols from the first stream of symbols;

calculate an unusualness score for each machine-readable word from the plurality of machine-readable words, to produce a plurality of unusualness scores, the calculating based on a statistical significance of that machine-readable word;

evaluate machine-readable words in a second stream of symbols to identify unusualness scores, from the plurality of unusualness scores, for the machine-readable words in the second stream of symbols;

identify abnormal activity of the object based on the unusualness scores for the machine-readable words in the second stream of symbols; and in response to identifying the abnormal activity of the object, sending alert data including an indication of the abnormal activity to an output device.

9. The computer-readable storage medium of claim 8, further storing instructions that, when executed by the processor, cause the processor to output a representation of the plurality of machine-readable words and statistics associated with each machine-readable word from the plurality of machine-readable words.

10. The computer-readable storage medium of claim 8, wherein the statistical significance is identified based on a frequency at which that machine-readable word is observed in the first stream of symbols.

11. The computer-readable storage medium of claim 8, wherein the plurality of machine-readable words is a first plurality of machine-readable words, the computer-readable storage medium further storing instructions that, when executed by the processor, cause the processor to:

determine a second plurality of machine-readable words from combinations of the symbols in the second stream of symbols based on the hierarchical learning model; and updating, via the hierarchical learning model, statistics associated with the first plurality of machine-readable words based on the second plurality of machine-readable words.

12. The computer-readable storage medium of claim 8, further storing instructions that, when executed by the processor, cause the processor to generate a feature model from the plurality of machine-readable words, the feature model including generalizations of the machine-readable words from the plurality of statistically significant machine-readable words.

13. The computer-readable storage medium of claim 8, further storing instructions that, when executed by the processor, cause the processor to generate a feature model based on the plurality of machine-readable words by:

identifying features associated with the cluster of vectors associated with each symbol from the first stream of symbols; and generalizing one or more machine-readable words from the first plurality of machine-readable words based on the features.

14. The computer-readable storage medium of claim 8, wherein the instructions to identify the plurality of statistically significant machine-readable words include instructions to evaluate statistics of each candidate word from a plurality of candidate words.

15. A system, comprising:
a processor; and
a memory storing processor-executable instructions that, when executed by the processor, cause the processor to:
receive, from a graphics processing unit (GPU), a first stream of symbols, each symbol associated with a cluster of vectors generated from normalized data, the normalized data associated with a plurality of video frames that includes a representation of an object;

identify a plurality of statistically significant machine-readable words based on a hierarchical learning model having a plurality of levels, each level from the plurality of levels associated with a different word length, each machine-readable word from the plurality of machine-readable words representing a recurring combination of symbols from the first stream of symbols;

calculate an unusualness score for each machine-readable word from the plurality of machine-readable words, to produce a plurality of unusualness scores, the calculating based on a statistical significance of that machine-readable word;

evaluate machine-readable words in a second stream of symbols to identify unusualness scores, from the plurality of unusualness scores, for the machine-readable words in the second stream of symbols;

identify abnormal activity of the object based on the unusualness scores for the machine-readable words in the second stream of symbols; and in response to identifying the abnormal activity of the object, sending alert data including an indication of the abnormal activity to an output device.

16. The system of claim 15, wherein the memory further stores instructions that, when executed by the processor, cause the processor to output a representation of the plurality of machine-readable words and statistics associated with each machine-readable word from the plurality of machine-readable words.

17. The system of claim 15, wherein the plurality of machine-readable words is a first plurality of machine-readable words, the memory further storing instructions that, when executed by the processor, cause the processor to:

determine a second plurality of machine-readable words from combinations of the symbols in the second stream of symbols based on the hierarchical learning model; and updating, via the hierarchical learning model, statistics associated with the first plurality of machine-readable words based on the second plurality of machine-readable words.

18. The system of claim 15, wherein the memory further stores instructions that, when executed by the processor, cause the processor to generate a feature model from the plurality of machine-readable words, the feature model including generalizations of the machine-readable words from the plurality of statistically significant machine-readable words.

19. The system of claim 15, wherein the memory further stores instructions that, when executed by the processor, cause the processor to generate a feature model based on the plurality of machine-readable words by:

identifying features associated with the cluster of vectors associated with each symbol from the first stream of symbols;

generalizing one or more machine-readable words from the first plurality of machine-readable words based on the features.

20. The system of claim 15, wherein the instructions to identify the plurality of statistically significant machine-readable words include instructions to evaluate statistics of each candidate word from a plurality of candidate words.

* * * * *